Patented Jan. 25, 1938

2,106,513

UNITED STATES PATENT OFFICE 2,106,513

PROCESS FOR EFFECTING BACTERICIDAL ACTION BY THE AID OF CHLORINE

William M. Allison, New York, N. Y.

No Drawing. Original application May 10, 1934, Serial No. 724,914. Divided and this application February 14, 1935, Serial No. 6,517

12 Claims. (Cl. 210—28)

This invention relates to process and compounds for effecting bactericidal action by the aid of chlorine and is herein illustrated as embodying bactericidal compounds having highly selective action.

It is not essential to the present invention that a compound be prepared in a dry form or even approximately pure, in fact I have found that chlorine compounds of urea are very unstable when not in relatively dilute solution. It has been found that water carrying a little urea in solution maintains some content of active chlorine longer than does water lacking the urea. Moreover, it has been found that ferrous iron carried in water is not sensibly oxidized to ferric iron by small amounts of chlorine if a proper amount of urea or one of its derivatives is present. The same is true of manganous compounds.

Apparently, moreover, a given amount of free chlorine in the presence of a suitable amount of urea or one of its derivatives is more effective in sterilizing water than is the same amount of chlorine without urea or one of its derivatives.

It has long been felt that a sterilizing medium was needed which, when applied to the sterilization of waters, would afford the maintenance of its sterilizing action over relatively long periods of time. When chlorine alone in small amounts is applied to water supplies of cities or towns, the active chlorine is dissipated in a very short time by the presence of both inorganic and organic matter and its sterilizing effect is lost in a very short time. This is primarily due to the fact that chlorine applied alone to waters has no selective action and will combine very quickly with any organic or oxidizable inorganic matter which may be present. Hence its sterilizing action is lost very quickly.

I have found that even in the presence of large quantities of organic or inorganic materials, in solutions which quickly dissipate the chlorine when the chlorine is present as simple chlorine in solution or as any of the hypochlorites that the presence of small quantities of urea or one of its compounds will prevent the said dissipation of the available chlorine for a relatively long period of time.

Apparently, also, a given amount of chlorine in the presence of a suitable amount of urea or one of its compounds is more effective in sterilizing solutions than is the same amount of available chlorine alone.

In the treatment of water to effect sterilization, a satisfactory result was obtained when the water carried one part of urea to six parts by weight of available chlorine, adding enough so that the water contained less than one part per million of available chlorine.

It is found that the dry urea may be added directly to the water containing available chlorine or water containing a relatively large amount of urea and available chlorine may be used as a minor solution for treating the water or solution to be sterilized. Good results have been obtained when some alkaline buffer salt such as alkaline phosphates or carbonates were present. In the presence of the small amounts of available chlorine mentioned above, the urea is very stable and nitrites or nitrates do not accumulate in the urea solutions.

Chlorine, when added to water in excess of the amount required to sterilize over an extended period of time, produces characteristic objectionable taste and odor with resulting production of irritation to the human mucous membranes when such solutions are applied thereto. In addition to this primary chlorinous taste and odor being produced in waters, secondary tastes and odors are produced by the interaction of the chlorine with phenols and other organic compound which may be present in the water supplies in very minute quantities and are not noticeable until such reaction with chlorine. Urea or one of its compounds added to such waters, prevents the production of objectionable chlorinous tastes and odors even when in relatively concentrated solution, and also prevents the formation of objectionable chlorophenols and other chemical combinations which are objectionable to the taste and smell.

It has also been found that guanidine or any of its compounds or derivatives will produce the same results, as did the urea when in solution. Apparently it is only necessary that at least one of the groups represented by

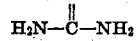

in which groups one or more of the hydrogen atoms may be replaced by a number of groups such as ethyl, phenyl or amine, be present in a compound intended for such action in stabilizing any available chlorine present, or applied after its addition to a solution.

This same principle may be applied to other solutions intended for other purposes.

It has been asserted that chloramines has greatly increased the efficiency of available chlorine in solution insofar as stabilizing such available chlorine to prolong its action in preventing slime in paper mills and such surfaces in contact with water, preventing and cleaning slime formations from the water surfaces of tube and other metal condensers used in power production and in the treatment of sewage effluents and waste products to prevent pollution of streams and bodies of water.

I have found that the combination of urea or one of its compounds, guanidine or one of its compounds or any of its derivatives with chlorine in solution acts as well or better in the stabilization of the available chlorine and in effecting better sterilization to accomplish the results desired.

In other words water carrying both available chlorine and urea or guanidine, or their derivatives or compounds, is highly effective for treating waters used in factories, such as condenser waters, in which this combination of substances is highly effective in killing bacteria on tube surfaces and in removing accumulations of them on the tubes, it is also highly effective in keeping free from bacteria other surfaces in contact with water such as spray ponds, condenser surfaces, and paper mill equipment. It is also useful for treating water in various manufacturing processes to reduce the growth of bacteria and other microorganisms. Such organisms have been found to attack stock in paper mills and in other ways are deleterious.

Suitable compounds of urea for such purposes are urea hydrochloride, phenyl urea, and urethane. Suitable compounds of guanidine are guanadine hydrochloride, diphenyl guanidine, and guanoguanidine.

If it is desired to add chlorine in another form, the urea or guanidine compounds carrying chlorine described in my copending application Serial No. 724,914, will be found useful.

Having thus described certain embodiments of the invention, what is claimed is:

1. The process of purifying water which consists in dissolving in it a urea compound with chlorine.

2. The process of purifying water which consists in dissolving in it a urea compound carrying available chlorine.

3. The process of purifying water which consists in dissolving in it urea with chlorine; the urea being present in less than one part per million, and the chlorine being present in an amount equal to several times the amount of urea.

4. The process of purifying water which consists in dissolving in it an amount of a substance containing the group represented by

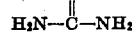

the amount not exceeding one part per million of the water, and with an amount of chlorine more than twice as great.

5. The process of purifying water which consists in dissolving in it a guanidine compound and chlorine.

6. The process of purifying water which consists in dissolving in it a guanidine and a compound carrying available chlorine.

7. The process of purifying water which consists in dissolving in it a guanidine compound carrying chlorine.

8. The process of purifying water which consists in dissolving in it an amount of a substance carrying the group represented by

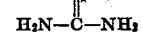

and also carrying chlorine, so that the water carries approximately one part per million of available chlorine.

9. The process of removing deposits on inorganic surfaces which consists in exposing them to water carrying a urea compound and available chlorine.

10. The process of removing deposits on inorganic surfaces which consists in exposing them to water carrying a guanidine compound and available chlorine.

11. In a process of water purification the step which comprises adding to water small quantities of carbamide and chlorine.

12. In a process of water purification the step which comprises adding carbamide and chlorine to water in the proportions of about 1 to 7 pounds of carbamide and about 4 to 16 pounds of chlorine respectively per million gallons of water.

WILLIAM M. ALLISON.